2,633,622

UNITED STATES PATENT OFFICE 2,633,622

STABILIZED ALUMINA PEBBLES

Sam P. Robinson, Bartlesville, Okla., assignor to Phillips Petroleum Company, a corporation of Delaware No Drawing. Application October 8, 1948, Serial No. 53,590

13 Claims. (Cl. 25—156)

The invention relates to the manufacture of stabilized alpha alumina pebbles for use in pebble heaters and in other heat exchange applications. A specific aspect of the invention pertains to alumina pebbles having high breakage and attrition resistance under severe conditions of cyclic thermal and mechanical shock in cyclic heat transfer apparatus and to a method of manufacturing such pebbles.

The invention also relates to the use of such pebbles in heat-exchange processes wherein heat is absorbed from a gas in one zone by a gravitating mass of pebbles and delivered to another gas in a second zone, with recycling of pebbles and concomitant thermal and mechanical shock to the pebbles.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are spheres ranging in size from about ⅛″ to 1″ in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as they descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated thru a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, involving the production of $CS_2$, and Serial No. 662,149, filed April 15, 1946, relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000 to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing through the apparatus and, especially, in the elevator equipment and in dropping from the top of the elevator into the top of the pebble heating zone. It is found that considerable breakage and loss of pebbles occurs when using conventional commercial pebbles under such severe conditions of operation.

Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operating conditions. However, it has been found that even when pebbles have been made by slugging and compacting the slugs into balls, they must be fired at a temperature within a critical range in order to properly bond the pebble crystals and produce a pebble which is rugged under severe conditions of service. Critical ranges for firing alumina pebbles containing various additives are disclosed in my copending applications Serial No. 23,245, filed April 26, 1948; Serial No. 53,589, filed October 8, 1948; Serial No. 53,991, filed October 11, 1948; and Serial No. 52,774, filed October 4, 1948.

It has been found that commercially available high purity alumina pebbles while having some very desirable characteristics have not been very satisfactory in commercial operation. Exposed to fast cooling shock at high temperatures, alpha corundum crystals tend to grow. Repeated firing to high temperature levels accelerates this growth which takes place at the expense of smaller alumina crystals in the sintered bond. After a certain time the pebbles begin to have a granular structure replete with large cracks throughout the body. Mechanical shock such as dropping into elevating or conveying equipment soon fractures a large quantity of such pebbles because of gradual disappearance of the strong but small bonding crystals.

In addition because of the purity of the pebbles and their consequent high melting point, it is necessary to sinter new pebbles in their manufacture at very high temperatures in order to develop good bond strength. With pure pebbles such as 99% $Al_2O_3$ commercial grades, one obtains large surface crystals if firing temperatures are maintained high enough to develop good bond strength. Because of the high purity, the surface crystal edges are quite sharp and well defined. Such crystals cause very high attrition losses in service which helps to make such types of pebbles very unsuited economically for pebble heater use because of high breakage and attrition losses and the consequent need for high make-up purchases.

In a pebble heater process requiring the circulation of between 25000 and 35000 pounds of pebbles per hour with a maximum temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble. It is with the improvement of high purity alumina pebble characteristics that this invention is concerned.

The invention has several objects, viz.,

To provide an improved alumina pebble having high resistance to breakage under severe conditions of cyclic thermal and mechanical shock;

To provide a method of producing high alumina content pebbles highly resistant to attrition losses when recycled continuously in cyclic heat transfer equipment;

To provide a method of heat treating pebbles compacted from alumina and an oxide, a compound converted to the oxide by heat, or a silicate of zirconium so as to develop a better bond between crystals and stabilize the growth of alumina crystals;

To provide a method of manufacturing thermal and mechanical shock-resistant pebbles free from laminar structure; and To provide an effective method of strengthening the bond between alumina crystals in a high purity alumina pebble.

Other objects of the invention will become apparent from a consideration of the accompanying disclosure.

The invention is concerned with the bonding of alumina crystals and stabilizing the crystals against further growth by the addition of specific bonding and stabilizing agents to high purity alumina. It is found that the addition of zirconium oxide or silicate to high purity alumina or aluminum hydroxide in an amount between 0.5 and 10 per cent, preferably, between 0.5 and 5 per cent (calculated as the oxide equivalent) by weight of the alumina effects a strong bond between the alpha corundum crystals of the final pebble and stabilizes the crystals against further growth while in service in a pebble heater apparatus at temperatures up to the firing temperature of the pebble. A much more attrition resistant pebble is likewise found to be produced. The process of the invention entails forming a homogeneous, plastic mix of a high purity alumina in powdered form and an additive selected from the group consisting of the oxide, compounds converted to the oxide by heating, and silicate of zirconium with or without additional plasticizing ball clay, preferably with water in the range of 15 to 25 per cent by weight of the mix. It also may be desirable to incorporate in the pebble mix between 1 and 5 per cent of a suitable organic binder which serves to hold the pebbles or balls in shape prior to the firing or calcining step if plasticizing ball clay is not used. Practically any of the conventional binding agents used in pelleting may be used as a temporary binder in compacting the alumina mix into balls preparatory to firing. Sterotex (hydrogenated corn oil), any of the synthetic or natural resins, petroleum pitch, stearic acid, aluminum stearate, etc., may be suitable temporary binders for the pebbles. The pebbles or balls may also be compacted from a homogeneous, plastic mix of the pebble constituents and the temporary binder without the use of added water, but stronger pebbles are obtained from an aqueous, plastic mix of the several constituents. The alumina for the pebbles of the invention may be incorporated in the mix in the form of alpha corundum, gamma alumina, or any of the hydrated aluminas which are convertible to alpha corundum by heating to elevated temperatures, or from aluminum hydroxide. It is desirable that the alumina be of high purity such as 99 per cent and preferably 99.5 per cent. Purified bauxite, precipitated aluminum hydroxide, and the alumina manufactured in the Bayer process are examples of suitable raw materials for the alumina. A preferred alumina is the finely divided precalcined crypto-crystalline alpha corundum formed by sintering Bayer process alumina near 2100° F.

When utilizing zirconium oxide as a binder and crystal stabilizer, it may be added in the oxide form ($ZrO_2$), in the form of zirconium silicate ($ZrSiO_4$), metazirconic acid ($H_2ZrO_3$), or zirconium hydroxide ($Zr(OH)_4$ or $ZrO(OH)_2$). Preferred commercial forms are purified oxide or high purity minerals such as baddeleyite or zircon. In compacting pebbles according to the invention, a homogeneous, aqueous, plastic mix is formed by mixing the alumina, and zirconium compound additive, plasticizing and/or temporary binders, all in finely divided form. They are thoroughly plasticized, by treatment in a mulling pan mixer with sufficient water to obtain a mix containing between 10 and 25 weight per cent water which has the proper consistency for extrusion. The water content may be adjusted either up or down at any time during the plasticizing and homogenizing step to within the range just recited so as to obtain the proper consistency for extrusion. The homogeneous mix or paste is then preferably extruded through dies, in either a piston or a screw type extrusion press, into macaroni type cylinders or rods which are automatically cut off into short lengths corresponding to the diameter or cross-section of the rods so as to form slugs adaptable for balling. Deairing is preferred with the screw extruder. Drying the paste or mix to a moisture content within the range of 10 to 25 per cent is necessary in order to permit proper extrusion. The moisture content for the extrusion step is important because, when it amounts to less than 10 per cent, the slugs formed from the extruded rods are not completely homogeneous in structure and will result in the formation of an inferior pebble. If the moisture content exceeds 25 per cent, the extruded rods are too sticky and the slugs cannot be properly handled in the subsequent balling step. For best performance during extrusion, a moisture content between 16 and 20 per cent by weight is desirable. When making $\frac{5}{16}''$ pebbles, extrusion of the plastic mix into $\frac{3}{8}''$ rods and cutting them into $\frac{3}{8}''$ lengths permits the compacting of slugs which will be of the desired size after firing. High pressure extrusion of this type, preferably in a piston type press, with or without deairing of the feed, is much preferred to other methods of preparing the slugs for the balling operation, inasmuch as a homogeneous body results with minimum variations in structure after firing together with avoidance of laminar structure. However, other methods of preparing the slugs are within the scope of the invention.

Following the cutting of the extruded mix into slugs, the slugs are preferably dried to a moisture content between 10 and 15 per cent by weight before compacting or rolling into balls, the next step of the operation. Wetter slugs tend to ball up and stick together, while dry slugs roll up into balls which develop internal cracks upon firing. A preferred moisture content for this step lies between 11.5 and 13 per cent. Compacting of the alumina slugs into balls or pebbles can be performed in several ways. Rolling of the slugs in a balling machine utilizing three-dimensional rotation in a cylindrical drum placed at angles to all three axes of conventional rotary equipment is found to make the most suitable pebbles upon firing. The balls are more firmly compacted and more nearly spherical in shape than when made by any other known method. This is probably due to the fact that the slugs are rolled in all directions during the rolling or compacting step. The resulting spherical pebbles containing the proper amount of moisture do not stick together and may be stored temporarily or transferred directly to the next step which is the firing operation. This tumbling mill may be hot air or flue gas swept to eliminate the predrying step.

After the balling step it is necessary to thoroughly but slowly dry the balls to less than one weight per cent moisture before firing to high temperatures. This can be accomplished in a variety of commercial dryers. Slowness in drying is required to insure removal of moisture from the center core of the pebble and to prevent cracked internal structure from too fast heating and drying in the subsequent calcining kilns.

The critical firing temperature of the compacted balls of alumina and stabilizer is found to lie in the range of 2950° to 3250° F. with an optimum range of 3050° to 3150° F. When the pebbles are fired at lower temperatures, the bond is apparently not sufficiently developed and when firing above this range, the pebbles are apparently too hard and rigid under conditions of cyclic thermal and mechanical shock and have poorer attrition resistance in pebble heater operation. Firing in the above range must be continued for at least 3 hours and until the porosity of the pebbles lies in the range of 5 to 20%, and preferably 7 to 15% (both available and unavailable porosity). When hydrated alumina, gamma alumina, or aluminum hydroxide is included in the initial pebble composition, it is gradually converted to alpha alumina (corundum) as the heat treatment of the pebble progresses at elevated temperatures upward of about 1800° F. During the firing to high temperature several changes occur depending upon the raw material and plasticizer added to the alumina. Hydrates of alumina, aluminum silicates, etc., will first decompose with liberation of water. Hydroxides will then decompose to the corresponding oxides. Non-crystalline alumina if present will progressively be converted to gamma and then to finely crystalline alpha alumina. Above 2400° F. silica-rich silicates will be converted to mullite and zircon with nascent and excess silica reacting with excess alumina to form mullite. By the time alpha alundum crystals would naturally start to grow in a pure alumina pebble by cannibalization of smaller alumina crystals, they have been at least partially coated by mullite, zircon or complex glasses resulting from partial formation of zircon or mullite or viscous glasses from the impurities added. At temperatures above 2800° F. where more rapid alpha corundum crystal growth usually takes place, more and more zircon and mullite have been formed in situ from the reaction between excess alumina and the glass formed from silica-rich silicate decomposition at lower temperature. As a consequence at still higher temperatures, the pebble composition essentially becomes pure alpha corundum, zircon, mullite and a minor portion of unconverted glass, usually less than one per cent if the added glass forming impurities in the zirconium mineral and/or plasticizing ball clay are kept at a minimum by careful choice of raw materials low in oxides of iron and the alkali and alkaline earth metals.

By incorporating both zircon and mullite into the pebble, alpha corundum crystal growth is more effectively stabilized than when either alone has been added. If too much of both are added however, a low melting 2850–3000° F. ternary eutectic composition of varying and not too well clarified $xAl_2O_3 \cdot yZrO_2 \cdot zSiO_2$ content is formed.

Most commercial zirconium minerals contain major portions of silica as impurity. They can be purified by solution in acid, neutralization and reprecipitation after solution and filtering, etc., but such steps are expensive. Since plastic ball clay is perhaps the cheapest and most efficient plasticizer and preliminary bonding agent for the pebble making process and since it may contain as much as 60% total $SiO_2$, it is not considered worthwhile to pay a premium for commercial zirconium minerals just to insure low impurities content.

When silica is present in the resulting fired pebble, alumina crystal growth is apparently stabilized by alumina crystal wetting in the range where alpha corundum crystal growth is normally rampant. This wetting makes it difficult for larger alumina crystals to grow by cannibalization of the smaller alumina crystals until all of the impurities recrystallize and separate most of the alumina grains. The random distribution and interlocking matting of mullite and zircon crystals in the alumina imparts greater resiliency and shock resistance to the alumina pebble. By preventing large growth of surface alumina crystals and smoothing and filling in the surface between larger surface crystals, they improve attrition resistance of the resulting alumina pebble without otherwise materially influencing desirable properties when as little as 0.5% and as much as 10% $ZrSiO_2$ (calculated as $ZrO_2$ content by weight) is incorporated into the final pebble composition.

It has also been found that the addition of $ZrO_2$ per se without the presence of any $SiO_2$, either free or combined, likewise improves the performance of high purity alumina pebbles though for an apparently different reason. It is especially effective in controlling $Al_2O_3$ crystal size when added as the hydroxide, chloride, or nitrate to the original mix so that when $ZrO_2$ is formed in the pebble it is in a very finely divided and dispersed state. Since the available phase diagrams on $Al_2O_3$—$ZrO_2$ eutectic compositions all show melting points above that of $Al_2O_3$ itself and much above the firing range of the pebbles, it is not possible to account for $Al_2O_3$ crystal growth inhibition by $Al_2O_3$ crystal wetting. It is believed that the finely divided $ZrO_2$, when it is crystallized by heat, migrates to and enters the $Al_2O_3$ crystal space lattice and, when once in, it effectively interferes with large growth of alpha corundum crystals upon further heating and heat shock. Irrespective of the explanations, when pebbles are properly formulated from alumina and between 0.5 and 10% $ZrO_2$ and fired according to the invention, the result is a highly heat shock, attrition, and heat resistant pebble.

Firing or calcination of the pebbles can be suitably effected in any conventional equipment which results in maintaining the entire mass of pebbles at a relatively even temperature within the specified range. Firing in continuous shaft kilns produces pebbles which are inferior in service in pebble heater operation because they are not uniformly heated in all parts of the bed, a large proportion being either underfired or overfired. The former are not strong and stand up poorly to heat and mechanical shock and attrition while the latter are too rigid and soon develop cracks along large crystal faces which results in early breakage in service, as well as low resistance to attrition.

The following examples illustrate the invention, but are not to be construed as unduly and unnecessarily limiting the invention.

*Example I*

900 pounds of Bayer process alumina previously calcined to 2100° F. is intimately mixed with 50 pounds of high grade commercial zircon ($ZrSiO_4$) and 50 pounds (dry basis) of a selected plastic ball clay low in the oxides of iron and the alkali and alkaline earth metals. The zircon is milled so that the major portion passes 325 mesh. Enough water is added so that a stiff paste of approximately 17% $H_2O$ content is formed after intensive mixing. This material is then extruded in a piston type extrusion press and automatically sliced into cylindrical slugs approximately ⅜" in diameter by ⅜" long. These are then tumbled into spheres in a three dimensionally rotated tumbling drum swept by low temperature flue gas to reduce moisture content to 12%. Residence time in the tumbling drum is kept at a minimum of 30 minutes before the partially dried spheres are discharged. They are then slowly dried in conventional flue gas or Dutch oven fired dryers to remove free water. Final firing is accomplished in a periodic kiln allowing a 12 hour heat soak at 3000° F. with commercial ring rates to and from this top temperature.

The fired and cooled pebble of approximately $\frac{5}{16}$" diameter is smooth, hard, dense and strong. Total porosity ranges from 10 to 12% with a crushing strength averaging more than 1500 pounds. The average crystal size of the alpha corundum is under 5 microns with very few if any crystals being larger than 20 microns in any dimension.

*Example II*

900 pounds of Bayer process alumina previously calcined to 2100° F. is intimately mixed with 30 pounds of high $ZrO_2$ content babbelcyite ($ZrO_2$) and 70 pounds of a good plastic ball clay low in glass forming impurities. Other conditions for forming pebbles are the same as in Example I. Properties of the finished pebble are very similar to those of Example I. Individual crystals are strongly bonded cryptocrystalline and low glass content bonding material.

*Example III*

850 pounds of Bayer process alumina previously calcined to 1800 to 2200° F. is mixed with 150 pounds of screened zircon sand, 25 pounds of carboxymethyl cellulose, 20 pounds of Sterotex as a temporary bonding agent, and enough water for proper extrusion. After compacting into pebbles and drying, the pebbles are fired to 3100° F. for 5 hours.

A smooth, dense, hard, and strong pebble results, resistant to both attrition and heat shock. Maximum crystal size of zircon and corundum grains is 30 microns with an average of about 6 microns. Total porosity ranges from 12 to 15% with crushing strength of at least 1200 pounds.

*Example IV*

900 pounds of Bayer process alumina previously calcined to 1800 to 2200° F. is mixed with 80 pounds of $Al(OH)_3$ and to this mixture is added the equivalent of 20 pounds of $ZrO_2$ as $Zr(OH)_4$, 30 pounds of molasses, 25 pounds of Sterotex and enough water for proper extrusion. After thorough mixing to a stiff paste, the material is extruded in an augur extrusion press equipped with deairing auxiliaries and cut into slugs ⅜" long by ⅜" in diameter before feeding into a three dimensionally rotated tumbling drum. The tumbling drum is air or flue gas swept to reduce moisture content in the final pebble to approximately 11% after thirty minutes of tumbling. The product pebble is then slowly dried and calcined in a tunnel kiln to 3100° F. for 12 hours.

Exceptionally uniform alumina crystals of medium size (5 to 8 microns) bonded to each other results. Crushing strengths in excess of 1500 pounds at a total porosity of 8 to 11% are obtained. There is no glassy residue. Pebble surfaces are smooth from the high temperature sintering and present no sharp, jagged edged corundum crystals. This pebble stands up exceptionally well in heat shock and attrition tests. Compared to a non-stabilized alumina pebble, relative resistance to heat shock increases over four fold in cyclic accelerated heat shock tests while resistance to attrition against itself increase about 240%.

Certain modifications of the invention will become apparent to those skilled in the art and the illustrative details disclosed are not to be construed as imposing unnecessary limitations on the invention.

I claim:

1. A process for manufacturing stabilized alumina contact material in the form of pebbles highly resistant to attrition and breakage under cyclic thermal and mechanical shock conditions, which comprises compacting 1/8" to 1" spheres from a finely comminuted, aqueous, homogeneous plastic mix of alumina and a zirconium compound selected from the group consisting of the oxide, compounds converted to the oxide by heating, and the silicate, said zirconium compound amounting to between 0.5 and 10 per cent by weight (calculated as the oxide equivalent) of the alumina; drying said spheres; and calcining the dried spheres at a temperature in the range of 2950° to 3250° F. for at least 3 hours and until the porosity lies in the range of 5 to 20 per cent.

2. The process of claim 1 in which zirconium silicate is incorporated in the mix.

3. The process of claim 1 in which zirconium oxide is incorporated in the mix.

4. A process for manufacturing stabilized alumina contact material in the form of pebbles highly resistant to attrition and breakage under cyclic thermal and mechanical shock conditions, which comprises forming a homogeneous, aqueous, plastic, finely comminuted mix of alumina of at least 99 per cent purity and a zirconium compound selected from the group consisting of the oxide, compounds converted to the oxide by heating, and the silicate in which said zirconium compound amounts to between 0.5 and 10 per cent by weight (calculated as the oxide equivalent) of the alumina; adjusting the water content of the mix to the range of 16 to 20 per cent by weight; forming the mix into slugs suitable for compacting into 1/8" to 1" balls; drying the slugs to a water content in the range of 10 to 15 per cent by weight; compacting the partially dried slugs into balls of the aforesaid size; slowly drying said balls; and calcining the dried balls at a temperature in the range of 2950° to 3250° F. for at least 3 hours and until the final porosity lies in the range of 7 to 15 per cent.

5. The process of claim 4 in which a volatile organic binder is incorporated in the mix in an amount between 2 and 10 per cent by weight thereof.

6. The process of claim 4 in which said compound is zirconium silicate.

7. The process of claim 4 in which said compound is zirconium oxide.

8. A process for manufacturing stabilized alumina contact material in the form of pebbles highly resistant to attrition and breakage under cyclic thermal and mechanical shock conditions, which comprises forming a homogeneous, aqueous, plastic, finely comminuted mix of alumina, 80 per cent of which is between 200 and 325 mesh fineness, and a zirconium compound selected from the group consisting of the oxide, compounds converted to the oxide by heating, and the silicate, said zirconium compound being at least as fine as the alumina and amounting to between 0.5 and 5 per cent by weight (calculated as the oxide equivalent) of the alumina; adjusting the water content of the mix to the range of 16 to 20 per cent by weight; extruding the mix into 1/8" to 1" rods; dividing the rods into slugs 1/8" to 1" in length; drying the slugs to a water content in the range of 10 to 15 per cent weight; compacting the partially dried slugs into balls by rolling and tumbling; slowly drying the balls to a moisture content below 1 per cent; and calcining the dried balls at a temperature in the range of 3050° to 3150° F. for at least 3 hours and until the porosity lies in the range of 7 to 15 per cent, thereby stabilizing the alumina crystals against growth at temperatures up to said calcining temperatures.

9. The process of claim 8 in which said compound is zirconium silicate.

10. The process of claim 8 in which said compound is zirconium oxide.

11. A method of heat treating pebbles compacted from a moist mix of alumina and a zirconium compound selected from the group consisting of the oxide, compounds converted to the oxide by heating, and the silicate so as to improve the breakage and attrition resistance thereof under severe conditions of cyclic thermal and mechanical shock in moving bed type heat transfer systems, which comprises drying said pebbles and calcining the dried pebbles at a temperature in the range of 2900° to 3250° F. for at least 3 hours and until the porosity thereof lies in the range of 5 to 20 per cent, thereby stabilizing the alumina crystals against further growth at temperatures up to the calcining temperatures.

12. A stabilized alumina pebble made by the process of claim 1 and consisting essentially of alumina and zirconium oxide in an amount between 0.5 and 10 weight per cent based on the weight of the alumina, said zirconium oxide being dispersed uniformly throughout said pebble so as to form a substantially homogeneous composition.

13. The pebble of claim 12 containing from 0.5 to 5 weight per cent zirconium oxide based on the weight of the alumina and having a porosity in the range of 7 to 15 per cent.

SAM P. ROBINSON.

REFERENCES CITED

The following references are of record in the file of this patent:

UNITED STATES PATENTS

| Number | Name | Date |
|---|---|---|
| 2,007,742 | Brown | July 9, 1935 |
| 2,035,845 | Stanton | Mar. 31, 1936 |
| 2,304,133 | Wilson et al. | Dec. 8, 1942 |
| 2,389,636 | Ramseyer | Nov. 27, 1945 |
| 2,463,979 | Langrod | Mar. 8, 1949 |